(12) United States Patent
Lih et al.

(10) Patent No.: US 9,529,775 B2
(45) Date of Patent: Dec. 27, 2016

(54) NETWORK TOPOLOGY OF HIERARCHICAL RING WITH GRAY CODE AND BINARY CODE

(71) Applicant: Futurewei Technologies, Inc., Plano, TX (US)

(72) Inventors: Iulin Lih, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 14/528,986

(22) Filed: Oct. 30, 2014

(65) Prior Publication Data

US 2015/0117224 A1 Apr. 30, 2015

Related U.S. Application Data

(60) Provisional application No. 61/897,293, filed on Oct. 30, 2013.

(51) Int. Cl.
*H04J 14/00* (2006.01)
*G06F 15/173* (2006.01)
*H04L 12/721* (2013.01)
*H04L 12/437* (2006.01)
*G06F 15/78* (2006.01)

(52) U.S. Cl.
CPC ..... *G06F 15/17362* (2013.01); *G06F 15/7825* (2013.01); *H04L 12/437* (2013.01); *H04L 45/06* (2013.01); *Y02B 60/1207* (2013.01); *Y02B 60/1225* (2013.01)

(58) Field of Classification Search
CPC .................................. H04L 41/12; H04J 14/00
USPC ........................................................... 370/258
See application file for complete search history.

(56) References Cited

U.S. PATENT DOCUMENTS

| 9,065,582 B2 * | 6/2015 | Barry ..................... H04J 14/00 |
| 2004/0258177 A1 * | 12/2004 | Shen .................. H03M 13/1117 375/308 |
| 2008/0276091 A1 * | 11/2008 | Welin .................... H04L 67/104 713/170 |
| 2011/0206053 A1 | 8/2011 | Henry et al. |
| 2014/0078927 A1 | 3/2014 | Thubert et al. |

OTHER PUBLICATIONS

Kitani, T., et al., "A configuration method for structured P2P overlay network considering delay variations," International Conference on Network-Based Information Systems, Aug. 19, 2009, pp. 547-552.
Wang, J., et al., "A Survey and Comparison of Multi-Ring Techniques for Scalable Battlespace Group Communications," Proceedings of SPIE, vol. 5820, May 26, 2005, 12 pages.

(Continued)

*Primary Examiner* — Wei Zhao
(74) *Attorney, Agent, or Firm* — Futurewei Technologies, Inc.

(57) ABSTRACT

A hierarchical ring network comprising a plurality of nodes coupled in a base ring configuration such that each node is coupled to two adjacent nodes via base links, wherein the nodes are further coupled via a first level binary shortcut ring such that alternating nodes along the base ring act as first level nodes, and wherein each first level node is coupled to two nearest adjacent first level nodes via the first level binary shortcut ring.

20 Claims, 12 Drawing Sheets

(56) References Cited

OTHER PUBLICATIONS

Foreign Communication from A Counterpart Application, PCT Application No. PCT/US2014/063234, International Search Report dated Jan. 30, 2015, 4 pages.
Foreign Communication from A Counterpart Application, PCT Application No. PCT/US2014/063234, Written Opinion dated Jan. 30, 2015, 7 pages.

* cited by examiner

NETWORK TOPOLOGY OF HIERARCHICAL RING WITH GRAY CODE AND BINARY CODE

CROSS-REFERENCE TO RELATED APPLICATIONS

The present application claims benefit of U.S. Provisional Patent Application No. 61/897,293 filed Oct. 30, 2013 by Iulin Lih and entitled "Network Topology of Hierarchical Ring with Gray Code and Binary Shortcuts," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An interconnection network or system enables data communication among its components or nodes. Exemplary interconnection networks include switches, routers, processor-memory systems, input/output (I/O) systems, system-on-chip (SoC), network-on-chip (NoC), and multiple-chip systems. A SoC integrates all the functionality of a computer or other complex electronic data system onto a single integrated circuit or chip. Data in an interconnection network may be exchanged from one node to another node in a transaction. Such a transaction may comprise phases such as a request for data, a transmission of the data, and an acknowledgment of receipt of the data. The data may be exchanged in the form of a message or a packet, which typically comprises a header containing control information and a payload containing the intended data.

Network topology refers to the arrangement of the nodes in an interconnection network. Topology design affects network performance, cost, power use, and flexibility, etc. For example, a first type of topology may provide for faster transaction completion compared to a second type of topology, but may require more expensive hardware compared to the second type of topology. Consequently, topology design involves weighing many factors and is an important aspect of network implementation.

SUMMARY

In one embodiment, the disclosure includes a hierarchical ring network comprising a plurality of nodes coupled in a base ring configuration such that each node is coupled to two adjacent nodes via base links, wherein the nodes are further coupled via a first level binary shortcut ring such that alternating nodes along the base ring act as first level nodes, and wherein each first level node is coupled to two nearest adjacent first level nodes via the first level binary shortcut ring.

In another embodiment, the disclosure includes a method of routing messages in a hierarchical ring network topology at a node that comprises first, second, third, fourth, and fifth ports, the method comprising receiving, at the first port, a first message from an adjacent first node via a first base link in a base ring, receiving, at the second port, a second message from an adjacent second node via a second base link in the base ring, receiving, at the third port, a third message from a non-adjacent third node via a first shortcut link in a first level binary code shortcut ring, receiving, at the fourth port, a fourth message from a non-adjacent fourth node via a second shortcut link in a second level binary code shortcut ring, receiving, at the fifth port, a fifth message from a non-adjacent fifth node via a third shortcut link in a first level gray code shortcut ring, and determining respective next hops for the first, second, third, fourth, and fifth received messages based at least in part on a shortest path routing table stored in the node, wherein a jump distance between the node and the fourth node along the base ring doubles a jump distance between the node and the third node along the base ring, and wherein the node and the fifth node have gray code encoded addresses that differ by one bit at a particular bit position.

In yet another embodiment, the disclosure includes an interconnection system comprising a plurality of nodes, each comprising at least four ports, and a plurality of links configured to interconnect ports among the nodes to form a hierarchical ring topology, wherein the ring topology comprises a plurality of hierarchical rings including a base ring, a plurality of levels of binary code shortcut rings, and at least one gray code shortcut ring, wherein nodes connected to any higher-level binary code shortcut ring are a subset of nodes connected to any lower-level binary code ring, and wherein each pair of adjacent nodes on a gray code shortcut ring have encoded addresses that differ by one bit at a particular bit position.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of hierarchical ring network topologies that improve both bandwidth and latency by adding a combination of binary coded and gray coded shortcut links to a base ring network topology. The base ring, sometimes referred to as a level 0 ring, connects every node like a simple ring network topology, upon which multiple levels of binary code shortcut rings are added. In the binary code shortcut rings, nodes positioned along any higher-level shortcut ring are selected from an alternating set of nodes (e.g., jump distance doubles) in an immediately lower shortcut ring. For example, a level 1 binary code shortcut ring evenly connects half of the nodes in a base ring. A level 2 binary code shortcut ring evenly connects half of the nodes in the level 1 shortcut ring. This sequence may be recursively iterated to higher levels. The binary jump distances, which are predictable based on mathematical equations, may simplify the determination of a shortest path to a next hop across the hierarchical ring network. In addition, gray code shortcut rings are also added to the base ring, and each pair of adjacent nodes on a gray code shortcut ring have gray code encoded addresses that differ by one bit at a particular bit position. The combination of binary coded and gray coded shortcut rings realizes unique benefits, such as higher bandwidth, lower latency, and more routing options, that are otherwise unavailable with using only one coding algorithm.

This disclosure defines a hierarchical ring network topology that offers a log rule based scalable latency and bandwidth and has implementation-friendly characteristics and low-cost node station structures. This disclosure includes a high performance and low cost routing algorithm that offers low implementation cost in ring buffering and control logic, as well as simple control logic to reduce component area and required cycle times. The disclosed embodiments provide various advantages including a simplified communication overhead in both cost and latency between the producers/request units and consumers/service units, improved delivery throughput and performance, improved power efficiency, improved scalability for parallel computing systems, improved system upgrade/migration productivity, and improved time to market.

Figure 1:
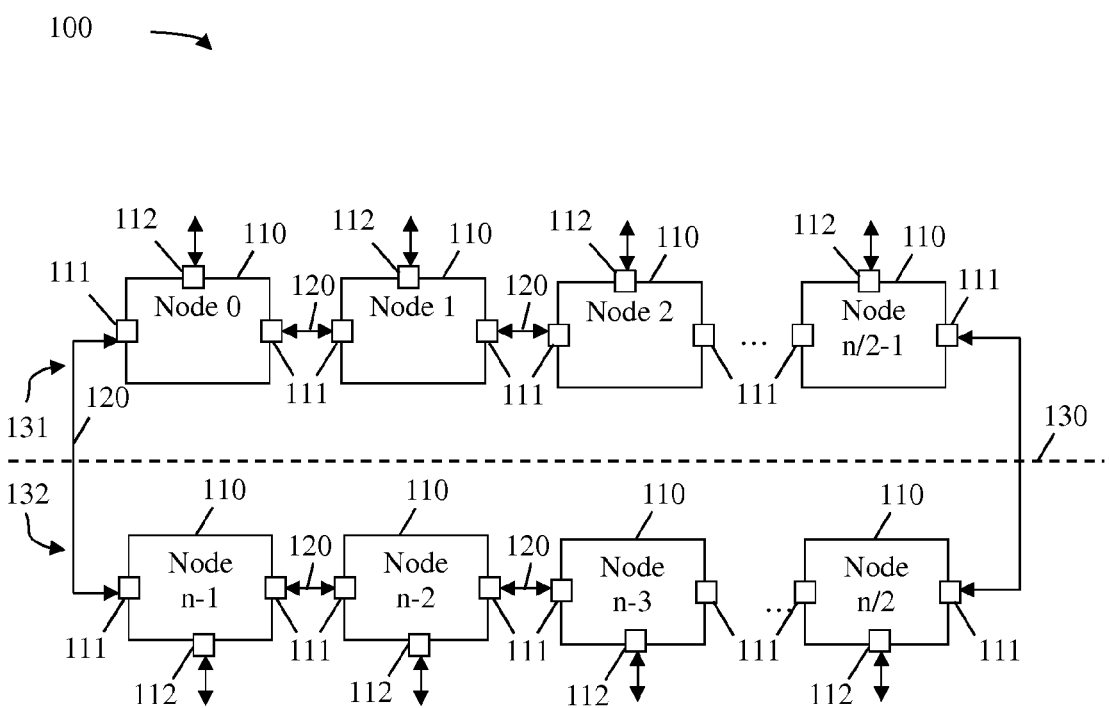
FIG. 1 is a schematic diagram of a network with a base ring topology.

FIG. 1 is a schematic diagram of a network 100 with a base ring topology. The network 100, sometimes referred to as a ring network or an interconnection system, comprises a plurality of nodes 110 interconnected by a plurality of links 120. The term link is used interchangeably with the term connection herein and refers to any physical or logical connection for transferring data. The links 120 are bi-directional links that can transfer data in opposite directions. The nodes 110 are any network elements (NEs) that send and/or receive (i.e., transceive) data in the network 100. For example, in a communication network, the nodes 110 may be routers, switches, and/or bridges, and the links 120 may be cables and/or optic fibers. In an SoC and/or NoC system, the nodes 110 may be processing cores, memory blocks, timing sources, and/or peripherals, and the links 120 may be switching fabric wires. In a printed circuit board, the nodes 110 may be any devices, modules, units, and/or components, and the link 120 may be wires. In a data center, the nodes 110 may be network equipment, such as servers, and the links 120 may be backplane cables.

Each node 110 comprises two interconnect ports 111 and an inject/eject (I/E) port 112, all of which are bi-directional physical ports. In the network 100, each node 110 is interconnected to two adjacent nodes 110 via the two interconnect ports 111 to form the ring topology. Each node 110 may act as a data source and/or a data sink. For example, when a node 110 is a data source, data is injected into the network 100 via the I/E port 112. Alternatively, when a node 110 is a data sink, data is ejected from the network 100 via the I/E port 112. As such, when data arrives at a node 110, the data may be transferred to a next node 110 and stay in the network 100 or exit the network 100. The ring topology shown in the network 100 uses a comparatively simple routing algorithm, since at each node there is no branch. A message on the ring may either proceed to a next node by staying on the ring or may get off of the ring and potentially reach any number of nodes 110. However, the ring topology of the network 100 yields a low bandwidth and a long latency.

For example, data may be transferred between any two nodes 110, a source node and a destination node, in a clockwise direction or in a counter clockwise direction in the network 100. When transferring data between non-adjacent nodes 110, the data traverses through multiple intermediary nodes 110 and links 120. The number of intermediary nodes 110 through which data traverses between a source and a destination is referred to as a hop count. As shown in the network 100, the number of nodes 110 is n and the maximum number of hops is about $$\frac{n}{2}$$

based on the clockwise transfer and the counter clockwise transfer. Considering all nodes, the average number of hops is about $$\frac{n}{4}.$$

The maximum number of hops and the average number of hops provide a latency measure for the network 100.

The line 130 represents a bisectional cut that divides the network 100 into two equal portions 131 and 132, each comprising the same number of nodes 110. The bisectional bandwidth refers to the total sum of bandwidth in each portion 131 or 132. The bisectional bandwidth is a measure for determining network performance. For example, when each node 110 injects data into the network 100 at an injection rate of I and each link 120 supports a bandwidth of J, a required bisectional bandwidth is about $$\frac{n \times I}{2}$$

and a supported bisectional bandwidth is about 4×J. Thus, the values n, I, and J are restricted to relationship n×I≤8×J. Table 1 below summarizes the network performance parameters for the network 100.

TABLE 1

Network Performance for the Network 100

| Maximum number of hops | $\frac{n}{2}$ |
|---|---|
| Average number of hops | $\frac{n}{4}$ |
| Required bisectional bandwidth | $\frac{n \times I}{2}$ |
| Supported bisectional bandwidth | $4 \times J$ |

Figure 2:
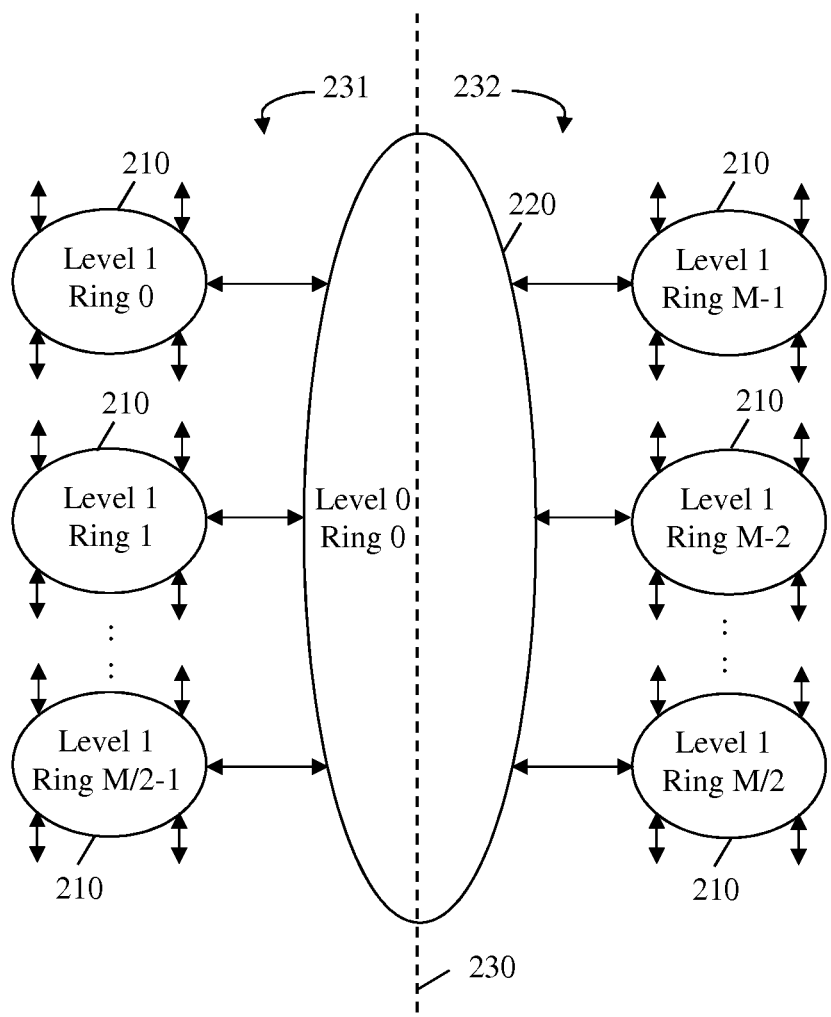
FIG. 2 is a schematic diagram of another network with a hierarchical ring topology.

FIG. 2 is a schematic diagram of another network 200 with a hierarchical ring topology. The network 200, sometimes referred to as a hierarchical ring network, comprises a plurality of level 0 ring networks 210 interconnected by a level 1 ring network 220. Each level 0 ring network 210 and the level 1 ring network 220 may have structures similar to the network 100. For example, each level 0 ring network 210 and each level 1 ring network 220 comprises a plurality of nodes, similar to the nodes 110, interconnected by links, similar to the links 120, to form a ring network. However, the network 200 divides a total n number of nodes into N×M nodes, where n=N×M. N nodes form a level 0 ring network 210. Thus, network 200 comprises M level 0 ring networks 210, each comprising N nodes. The level 1 ring network 220 connects the M level 0 ring networks 210 to enable data transfer between any level 0 ring networks 210. The level 1 ring network 220 operates similar to a ring network with M nodes.

Similar to the line 130 in the network 100, a line 230 represents a bisectional cut that divides the network 200 into two equal portions 231 and 232, each comprising the same number of nodes. In the network 200, the maximum number of hops is about $$\frac{N}{2}$$

in each level 0 ring network 210 and the maximum number of hops is about $$\frac{M}{2}$$

in the level 1 ring network 220. To transfer data from any node in a level 0 ring network 210 to any node in another level 0 ring network 210, the maximum number of hops is about $$N + \frac{M}{2}.$$

Thus, the average number of hops is about $$\frac{N}{2} + \frac{M}{4}.$$

Similar to the network 100, each N node in the level 0 ring network 210 or each M node in the level 1 ring network 220 injects data in to the network 200 at an injection rate of I and each link supports a bandwidth of J. Thus, the required bisectional bandwidth is about $$\frac{N \times M \times I}{2}$$

and me supported bisectional bandwidth is about J×4. The following Table 2 summarizes the network performance parameters for the network 200.

TABLE 2

Network Performance for the Network 200

| Maximum number of hops | $N + \frac{M}{2}$ |
|---|---|
| Average number of hops | $\frac{N}{2} + \frac{M}{4}$ |
| Required bisectional bandwidth | $\frac{N \times M \times I}{2}$ |
| Supported bisectional bandwidth | $J \times 4$ |

Based on Table 1 and Table 2, latency is linearly improved in the network 200 with the hierarchical ring topology. However, a supported bisectional bandwidth remains the same as the network 100 with the single ring topology. It should be noted that although the network 200 illustrates the hierarchical ring network as a two level ring network, the network 200 may be expanded into a K-level hierarchical ring network, where a plurality of $k^{th}$ level rings are connected by a $(k+1)^{th}$ level ring, where K and k are integers and 0≤k≤K. The network performance for a K-level hierarchical ring network comprises a similar trend as the 2-level ring network 200.

Figure 3:
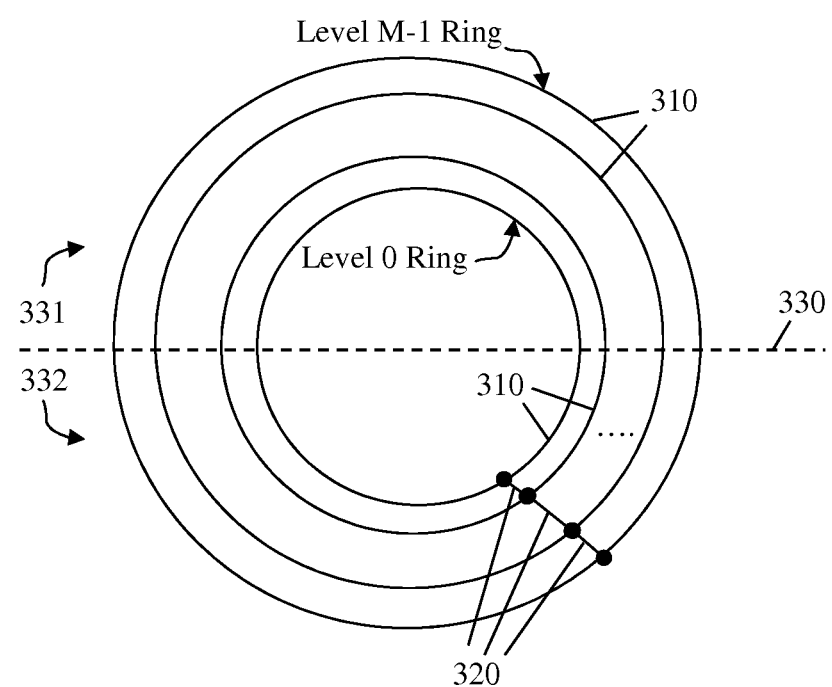
FIG. 3 is a schematic diagram of yet another network that has a parallel ring topology.

FIG. 3 is a schematic diagram of yet another network 300, which has a parallel ring topology. The network 300, sometimes referred to as a parallel ring network, comprises a plurality of ring networks 310 arranged in a concentric-ring configuration. Each ring network 310 may have a structure similar to the network 100. For example, each ring network 310 comprises a plurality of nodes (similar to the nodes 110) that are interconnected by links (similar to the links 120) to form a ring network 310. However, the network 300 divides a total n number of nodes into N×M nodes, where n=N×M, where every N nodes form a ring network 310. Thus, the network 300 comprises M parallel ring network 310, each comprising N nodes. For example, the network 310 in the innermost ring is referred to as the level M−1 ring and the outermost ring is referred to as the level 0 ring. The networks 310 may be interconnected by links 320, similar to the links 120, to enable data transfer between the networks 310.

Similar to the line 130 in the network 100, a line 330 represents a bisectional cut that divides the network 300 into two equal portions 331 and 332, each comprising the same number of nodes. In the network 300, any of the N×M nodes may be a source, and each node may be the destination of one of the M rings. Thus, the maximum number of hops is about $$\frac{N}{2}$$

and the average number of hops is about $$\frac{N}{4}.$$

Similar to the network 100, each node injects data into the network 300 at an injection rate of I and each link supports a bandwidth of J. Then, the required bisectional bandwidth is about $$\frac{N \times M \times I}{2}$$

and the supported bisectional bandwidth is about M×J×4. The following Table 3 summarizes the network performance parameters for the network 300.

TABLE 3

Network Performance for the Network 300

| Maximum number of hops | $\frac{N}{2}$ |
|---|---|
| Average number of hops | $\frac{N}{4}$ |
| Required bisectional bandwidth | $\frac{N \times M \times I}{2}$ |
| Supported bisectional bandwidth | $M \times 4 \times J$ |

By comparing Table 1 and Table 3, both the latency and the bandwidth are linearly improved in the network 300 with the parallel ring topology compared to the network 100. Other embodiments may employ higher parallelism, such as mesh and torus ring, to further improve ring network performance, but at the expense of higher complexity and/or cost.

The present disclosure employs hierarchical ring network topologies to improve network performance, such as latency and bandwidth, with a minimal increase in topology complexity. In an embodiment, a hierarchical ring comprises a base ring with additional levels of recursive shortcuts configured among subsets of nodes. Thus, bandwidth can be increased and latency can be decreased without requiring any additional nodes.

Figure 4:
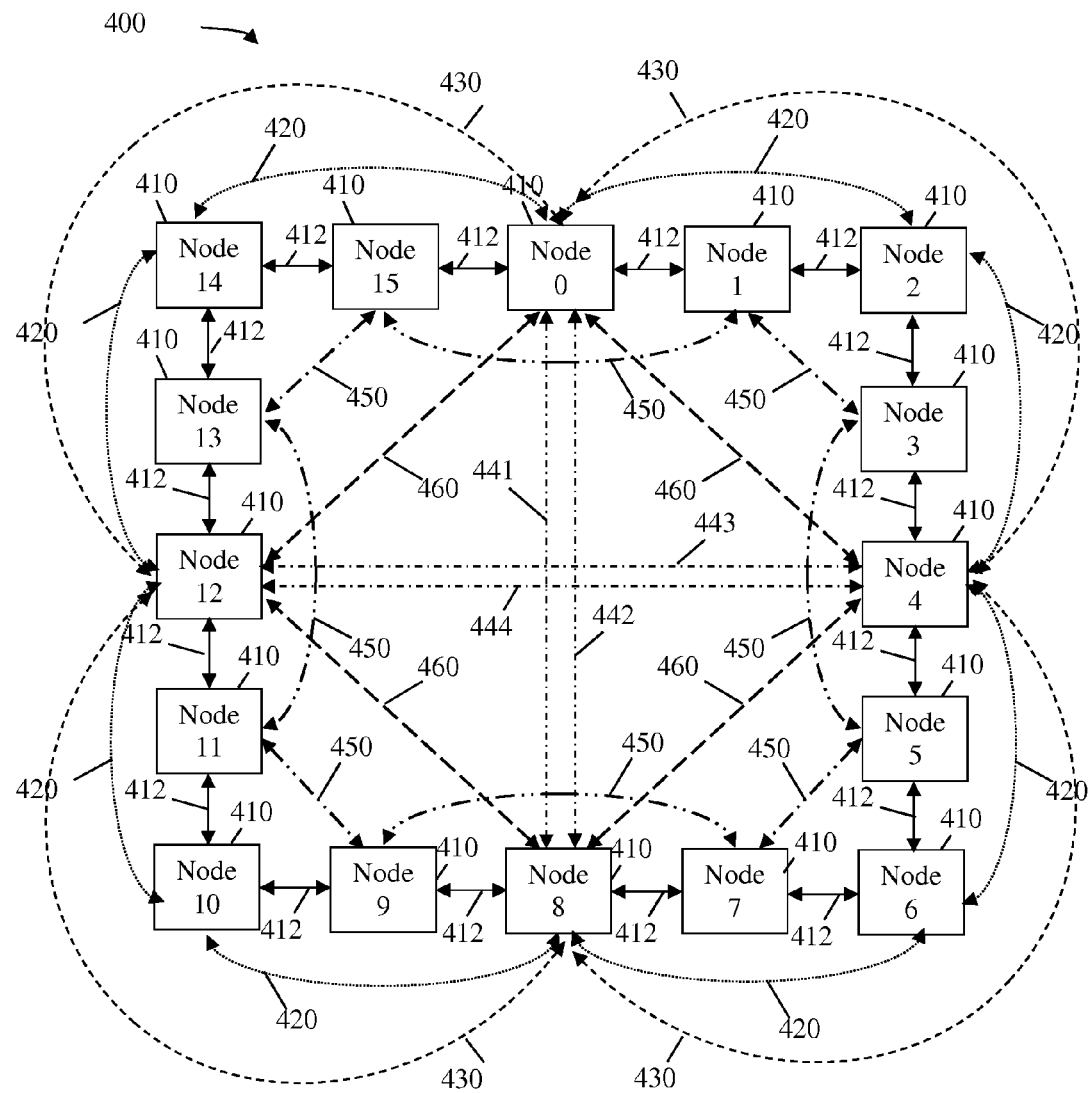
FIG. 4 is a schematic diagram showing an embodiment of a network with a hierarchical ring topology and recursive shortcuts.

FIG. 4 is a schematic diagram showing an embodiment of a network 400 with a hierarchical ring topology that comprises binary code and gray code shortcuts. The network 400, sometimes referred to as a ring network, comprises a plurality of nodes 410 interconnected by a plurality of base links 412 to form a base ring. The nodes 410, the base links 412, and the base ring may be similar to the nodes 110, the links 120, and the network 100, respectively. The base links 412 are referred to as level 0 links and the base ring is referred to as the level 0 ring. The network 400 further comprises two types of shortcuts, namely, a plurality of levels of binary code shortcut rings and at least one level of gray code shortcut rings. The multi-level binary code shortcut rings are formed using shortcuts 420, 430, and 441-444, while gray code shortcut rings are formed using shortcuts 450 and 460.

As shown in FIG. 4, the binary code shortcut rings include a plurality of level 1 shortcuts 420 (shown as dotted lines), a plurality of level 2 shortcuts 430 (shown as short-dashed lines), and a plurality of level 3 shortcuts 441, 442, 443, and 444 (shown as dot-dashed lines). The level 1 shortcuts 420, the level 2 shortcuts 430, and the level 3 shortcuts 441-444 are physical connections similar to the base links 412. A binary code is an addressing system wherein each successive address increments by one in a base two counting scheme. A binary shortcut is a shortcut that connects alternating nodes associated with a lower level ring. A binary shortcut ring is a ring comprising binary shortcuts of a common level. Each level of binary code shortcuts has a regular jump distance in term of node numbers. Specifically, the level 1 shortcuts 420 connect every two (e.g. alternating) nodes 410 (thus the name binary), the level 2 shortcuts 430 connect every four nodes (e.g. alternating level 1 nodes), and the level 3 shortcuts 441-444 connect every eight nodes (e.g. alternating level 2 nodes). For example, the nodes 410 that are connected by the level 1 shortcuts 420 are also referred to as level 1 nodes, the nodes 410 that are connected by the level 2 shortcuts 430 are also referred to as level 2 nodes, and the nodes 410 that are connected by the level 3 shortcuts 441-444 are also referred to as level 3 nodes. As such, the level 1 nodes interconnected by the level 1 shortcuts 420 form a level 1 binary code shortcut ring. The level 2 nodes interconnected by the level 2 shortcuts 430 form a level 2 binary code shortcut ring. The level 3 nodes interconnected by the level 3 shortcuts 441 and 442 form a level 3 binary code shortcut ring. The level 3 nodes interconnected by the level 3 shortcuts 443 and 444 form another level 3 binary code shortcut ring. The level 1 ring, the level 2 ring, and the level 3 rings are referred to as the binary code shortcut rings.

The level 1 nodes 410, the level 2 nodes 410, and the level 3 nodes 410 are selected based on a recursive algorithm. Each higher-level ring connects, via shortcuts, half as many nodes as in a lower-level ring. For instance, the level 0 ring (e.g., base ring) connects every node 410. The level 1 shortcut ring connects node addresses 0, 2, 4, 6, 8, 10, 12, and 14, which constitute a subset of the nodes 410 in the level 0 ring. Similarly, the level 2 shortcut ring connects node addresses 0, 4, 8, and 12, which constitute a subset of the nodes in the level 1 shortcut ring. Further, one level 3 shortcut ring connects node addresses 0 and 8, and another level 3 shortcut ring connects node addresses 4 and 12. Nodes 0 and 8 (or nodes 4 and 12) constitute a subset of the nodes in the level 2 shortcut ring. Following the same pattern, the selection of nodes for higher-level binary code shortcut rings can recursively reach any suitable number of levels.

In practice, a regular jump distance of two in the binary code shortcuts is sometimes advantageous, e.g., leading to an easier calculation of routing paths because node indexes are calculated and predictable. In an embodiment, binary code shortcut links may be configured such that each node address X is connected on the level k1 binary code shortcut ring, where X is an integer between 0 and N−2 that satisfies modular operation: X mod($2^{k1}$)=0. In other equivalent words, assume a ring topology with N=$2^K$ nodes, the links may be set up such that each two nodes adjacent on a level k ring are separated by ($2^k$−1) nodes, wherein k is an integer that satisfies relationship $0<=k<=(\text{Log}_2(N)-1)$. For instance, for the N=16 and k=4 case shown in FIG. 4, links are set up such that each two nodes adjacent on a level k ring are separated by $(2^k-1)$ nodes, where $0<=k<=3$. Specifically, each two nodes adjacent on level 0 ring are separated by 0 nodes (e.g. no intermediate nodes), each two nodes adjacent on level 1 ring are separated by 1 node, each two nodes adjacent on level 2 ring are separated by 3 nodes, and each two nodes adjacent on level 3 ring are separated by 7 nodes. In the network 400, node indexes 4 and 12 are used to form another level 3 ring, and are also separated by 7 nodes.

Further, assume nodes are addressed or labeled clockwise between 0 to (N-1). In an embodiment, the links are set up such that node indexes $(2^k)*I$ are used for the level k ring, where k and I are integers, $$0 <= k <= (\text{Log}_2(N)-1), \text{ and } 0 <= I <= \left(\frac{N}{2^k}-1\right).$$

For instance, for the N=16 and k=4 case shown in FIG. 4, links are set up such that node indexes $(2^k)*I$ are used for the level k ring, where $$0 <= k <= 3, \text{ and } 0 <= I <= \left(\frac{16}{2^k}-1\right).$$

Specifically, for k=0, level 0 base links use node indexes I, where $0<=I<=15$ (i.e., all nodes are used for the base ring). For k=1, level 1 shortcut links use node indexes 2*I, where $0<=I<=7$, which are node indexes 0, 2, 4, 6, 8, 10, 12, and 14. For k=2, level 2 shortcut links use node indexes 4*I, where $0<=I<=3$, which are node indexes 0, 4, 8, and 12. For k=3, level 3 shortcut links use node indexes 8*I, where $0<=I<=1$, which are node indexes 0 and 8. In the network 400, node indexes 4 and 12 are used to form another level 3 ring, which is an exception to the formula given in this paragraph. Instead, node indexes 4 and 12 are derived using $(2^k)*J$, where k=3, and J=0.5 and 1.5.

It should be noted that the top level binary code ring(s) (e.g. level 3 rings in the example of FIG. 4) may deviate from the general hierarchical formula to create cross hemisphere jumps at the cost of slightly increased routing complexity. In an alternative embodiment, the top level ring(s) may be required to employ the indexing schemes and/or relationships discussed herein. In an embodiment, each node at addresses $(2^k)*I$ comprises a minimum of $2^{k+1}$ interconnect ports, where $$0 <= k <= (\text{Log}_2(N)-1) \text{ and } 0 <= I <= \left(\frac{N}{2^k}-1\right).$$

The interconnect ports are configured to send and receive data in the interconnection system.

The multi-level gray code shortcut rings are formed using shortcuts 450 and 460. A gray code is a binary number system where two successive values differ by only one bit in a binary format. A gray code shortcut is a shortcut between nodes with addresses that differ by a bit from a previous address at a particular bit position associated with a level of the gray code shortcut. A gray code shortcut ring is a ring made up of grade code shortcuts each associated with a common level (e.g. bit position). A gray code algorithm is an algorithm for assigning gray code shortcuts. As shown in FIG. 4, the network 400 further comprises a plurality of level 1 gray code shortcuts 450 (shown as double dot-dashed lines) and a plurality of level 2 gray code shortcuts 460 (shown as long-dashed lines). The level 1 gray code shortcuts 450 and the level 2 gray code shortcuts 460 are also physical connections similar to the base links 412. Since gray code shortcuts 460 connect nodes that are already connected by binary code shortcuts 430, the gray code shortcuts 460 may be removed in some embodiments leaving only a level 1 gray code shortcut ring formed by shortcuts 450. When a network 400 comprises k gray code shortcut levels, the level k nodes are separated by $2^k-1$ nodes (e.g., a jump distance of $2^k$ in terms of nodes).

The placements of the level 1 gray code shortcuts 450 and level 2 gray code shortcuts 460 are determined based on a gray code algorithm. For example, the nodes 410 are assigned with consecutive integer addresses in the order of the nodes' 410 positions (e.g., in a clockwise direction or a counter clockwise direction) in the base ring. Thus, the nodes are arranged in an order of increasing addresses in one direction or an order of decreasing addresses in an opposite direction. The addresses of the nodes 410 are converted into gray codes. As shown in FIG. 4, the number of nodes 410 in the network 400 is sixteen and the addresses range from 0 to 15. The gray code encoded addresses for the sixteen nodes 410 are shown in Table 4 below.

TABLE 4

| Gray Code Encoded Node Addresses | |
|---|---|
| Node Addresses | Gray Code Encoded Node Addresses b[3:2:1:0] |
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

In the gray code algorithm, the nodes for a particular level are selected such that adjacent nodes in the particular level comprise gray coded encoded addresses that are differed by one at a particular bit position. For example, the level 1 gray coded nodes are selected based on a 1-bit switch at bit position 0 of the gray code encoded addresses, which leads to the nodes 410 with node addresses 1, 3, 5, 7, 9, 11, 13, and 15 to be selected for the level 1 shortcut ring. The bit position 0 refers to the right most bit or the first least significant bit (LSB) of the gray coded encoded addresses. The level 2 nodes are selected based on a 1-bit switch at bit position 1 of the gray code encoded node addresses, which leads to the nodes 410 with node addresses 2, 6, 10, and 14 to be selected for the level 2 shortcut ring. The level 3 nodes are selected based on a 1-bit switch at bit position 2 of the gray code encoded node addresses, which leads to the nodes 410 with node addresses 4 and 12 to be selected for the level 3 shortcut ring. By observing the gray code encoded addresses shown in Table 1, an additional level 3 shortcut ring may be formed by selecting another set of level 3 nodes based on a 1-bit switch at bit position 3 of the gray code encoded addresses, which leads to the nodes 410 with node addresses 0 and 7 to be selected for a second level 3 shortcut ring. Such a gray code addressing scheme enables data transfer to be achieved with a 1-bit address switch when the data is transferred over one of the gray code shortcuts 450 and 460. Since switching activities contribute to a significant portion of total power consumption, the reduction in switching activities may lead to a better power efficiency.

Mathematically, gray code shortcut links may be configured such that each node address X is connected on a level k2 gray code shortcut ring, and wherein X is an integer between 0 and N−2 that satisfies modular operations X mod($2^{k2-1}$)=0 and X mod($2^{k2}$)!=0. Take node 5 connected on level 1 gray code ring as an example, 5 mod $2^0$=0 and 5 mod $2^1$!=0. Take another node 4 connected on level 3 gray code ring as an example, 4 mod $2^2$=0 and 4 mod $2^3$!=0.

The shortcut placement scheme described above may be applied to a network with any number of nodes. For example, for a network with n nodes in a base ring, where n is a positive integer that is a power of 2, the maximum number of shortcut levels is $Log_2(n)-1$. To identify a set of level k nodes for level k gray code shortcut connections, the node addresses are converted into gray codes and the nodes with a 1-bit switch at the $k^{th}$ LSB (e.g., corresponding to bit position k−1) of the gray code encoded addresses are selected, where $1 \leq k \leq Log_2(n)-1$. For example, a first node is selected from the n nodes to be a level k node. To select a subsequent level k node, the gray code encoded addresses of the nodes subsequent to the first node (e.g., in a clockwise direction) in the base ring are compared to the first node's gray code encoded address. When a node comprises a gray code encoded address that toggles the $k^{th}$ LSB of the first node's gray code encoded address is found, the node is selected as the subsequent level k node. To identify a second shortcut ring for the last level, the nodes are selected based on a 1-bit switch at the $Log_2(n)^{th}$ LSB of the gray code encoded addresses. It should be noted that the nodes are selected such that each shortcut ring comprises a different set of the n nodes. However, unlike a purely gray coded ring network topology, the nodes 410 in the network 400 may not necessarily have the same number of ports. As shown in FIG. 4, certain nodes, such as those with addresses 0, 4, 8, and 12 belong to multiple binary code and gray code shortcut levels, while other nodes, such as those addresses 1, 3, 5, 7, 9, 11, 13, and 15 only have level 0 connections and level 1 gray code connections.

To further optimize data flow, the last level shortcuts are limited to transferring data in a particular half of the network 400. For example, the level 3 shortcut 441 transfers data for the left half (e.g., clockwise from node 8 to node 0 or counter clockwise from node 0 to node 8) of the network 400. The level 3 shortcut 442 transfers data for the right half (e.g., clockwise from node 0 to node 8 or counter clockwise from node 8 to node 0) of the network 400. The level 3 shortcut 443 transfers data for the upper half (e.g., clockwise from node 12 to node 4 or counter clockwise from node 4 to node 12) of the network 400. The level 3 shortcut 444 transfers data for the bottom half (e.g., clockwise from node 4 to node 12 or counter clockwise from node 12 to node 4) of the network 400.

In the network 400, any of the nodes 410 may be a source or a destination. However, data transfer may be limited to a clockwise direction or a counter clockwise direction, as discussed more fully below. Thus, the maximum number of hops is about $Log_2(n)-2$ and the average number of hops is about $(Log_2(n)-1)/2$, where n is the total number of nodes 410 in the network 400. Similar to the network 100, 200, and 300, each node injects data into the network 400 at an injection rate of I and each link supports a bandwidth of J. Then, the required bisectional bandwidth is about $$\frac{n \times I}{2}$$

and the supported bisectional bandwidth is about $(2*Log_2(n)-1) \times J \times 4$. The following Table 5 summarizes the network performance parameters for the network 400.

TABLE 5

| Network Performance for the Network 400 | |
|---|---|
| Maximum number of hops | $Log_2(n) - 2$ |
| Average number of hops | $(Log_2(n) - 1)/2$ |
| Required bisectional bandwidth | $\frac{n \times I}{2}$ |
| Supported bisectional bandwidth | $(2 * Log_2(n) - 1) \times J \times 4$ |

By comparing Table 4 to Tables 1, 2, and 3, both the latency and the bandwidth are improved in the network 400, where the improvements scale logarithmically instead of linearly.

Although FIG. 4 describes the recursive shortcut placements in a network with a total number of nodes that is a power of 2, the shortcut placement technique may be employed to configure a network with any number of nodes. For example, to generate a network with N number of nodes, where N is not a power of 2, the base ring is generated by employing M number of nodes, where M is the next higher-power of 2. The shortcuts are placed by employing the recursive shortcut placement scheme described above. Subsequently, extra nodes and/or extra links are deleted to provide N number of nodes. If the performance allows, any shortcut except the base links in the base ring may be removed to degenerate the number of shortcuts.

As a result of combining binary code shortcuts and gray code shortcuts, unique features can be achieved. Take the node address 0 as an example, which comprises a total of eight ports. Among the eight ports, node 0 comprises: (a) a first port for coupling to an adjacent first node (e.g., node 15) via a first base link (e.g., link 412) in a base ring; (b) a second port for coupling to an adjacent second node (e.g., node 1) via a second base link in the base ring; (c) a third port for coupling to a non-adjacent third node (e.g., node 2 or node 14) via a first shortcut link (e.g., link 420) in a first level binary code shortcut ring; (d) a fourth port for coupling to a non-adjacent fourth node (e.g., node 4 or node 12) via a second shortcut link (e.g., link 430) in a second level binary code shortcut ring; and (e) a fifth port for coupling to a non-adjacent fifth node (e.g., node 12 or node 4, or node 8 which can be considered a level 3 gray code node as well) via a third shortcut link in a first level gray code shortcut ring. As discussed above, the node 0 and the fifth node have gray code encoded addresses that differ by one bit at a particular bit position (LSB bit[2]).

Note that the second level binary code shortcut ring is immediately above the first level binary code shortcut ring in hierarchy. Therefore, a jump distance of four between the node and the fourth node along the base ring doubles a jump distance of two between the node and the third node along the base ring. As discussed above, suppose N is a positive integer representing a total number of the plurality of nodes, the second level binary code shortcut ring is a level k1 binary code shortcut ring, and k1 is an integer between 2 and ($Log_2(N)-1$). In an embodiment, the jump distance between the node and the fourth node equals $2^{k1}$. Further, when the nodes are arranged such that the nodes are represented using consecutive integer addresses ranging from 0 to N−1 in a single direction on the ring network, as shown in FIG. 4, binary code shortcut links may be configured such that each node address X is connected on the level k1 binary code shortcut ring, where X is an integer between 0 and N−2 that satisfies modular operation: $X \mod(2^{k1})=0$.

Further, suppose the first level gray code shortcut ring is a level k2 gray code shortcut ring, where k2 is an integer between 1 and ($Log_2(N)-1$). In an embodiment, a jump distance between the node and the fifth node equals $2^{k2}$. Moreover, the particular bit position corresponds to a $k2^{th}$ least significant bit (LSB) of the gray code encoded addresses when $1 \leq k2 \leq (Log_2(N)-2)$. Gray code shortcut links may be configured such that each node address X is connected on a level k2 gray code shortcut ring, and wherein X is an integer between 0 and N−2 that satisfies modular operations $X \mod(2^{k2-1})=0$ and $X \mod(2^{k2}) \neq 0$.

Figure 5A:
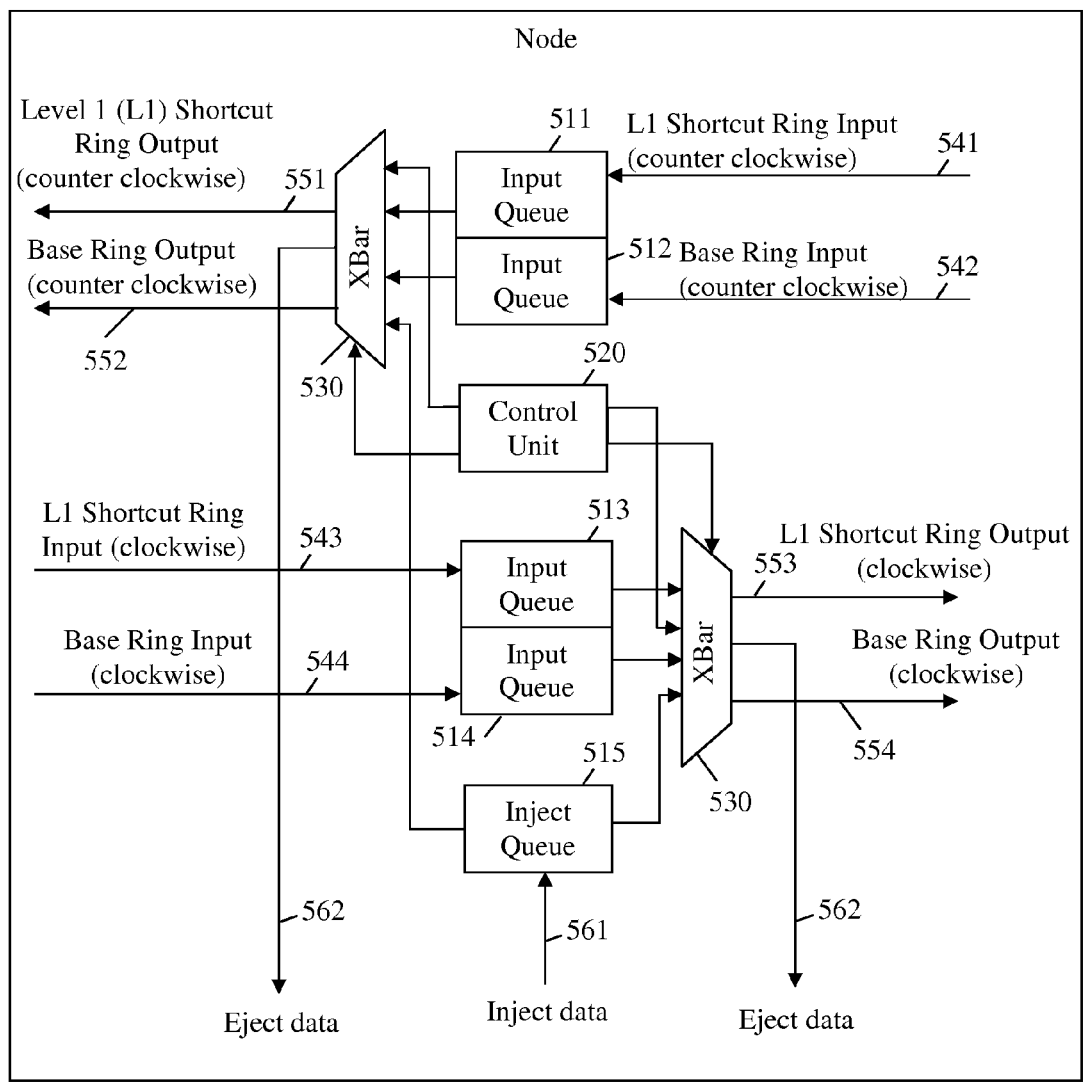
FIG. 5A is a schematic diagram of an embodiment of a logical structural view of a node that is used on a level 1 ring of a ring network.

FIG. 5A is a schematic diagram of an embodiment of a logical structural view of a node 500 that is used on a level 1 (but not level 2, or 3, or higher) ring of a ring network. The node 500 may represent any of nodes labeled 2, 6, 10, and 14 in the network 400 in FIG. 4. As shown in FIG. 4, different nodes may have different number of ports since they are involved in different levels of shortcut rings. FIG. 5A illustrates the logical structure of the node 500 for performing data transfer and flow control. The node 500 comprises a plurality of queues 511, 512, 513, 514, and 515, a control unit 520, and a plurality of crossbar (XBar) switches 530. The queues 511-515 may be a single block of memory, such as random-access memory (RAM), partitioned into a plurality of portions, each corresponding to a queue 511-515. Alternatively, each queue 511-515 may be a separate memory block. The queues 511-514 are configured to interface with interconnect input/output (I/O) ports, such as the interconnect ports 111. When operating in the network, each interconnect port receives data transferring in a clockwise direction and transmits data in a counter clockwise direction or receives data transferring in a counter clockwise direction and transmits data in a clockwise direction. For example, the queue 511 is configured to buffer data received from a counter clockwise shortcut ring input path 541, where the data is travelling in a counter clockwise in the level 1 shortcut ring. The queue 512 is configured to buffer data received from a counter clockwise base ring input path 542, where the data is travelling in a counter clockwise in the base ring (e.g., formed by base links 412). The queue 513 is configured to buffer data received from a clockwise shortcut ring input path 543 and the queue 514 is configured to buffer data received from a clockwise base ring input path 544. The queue 515 is configured to interface with an I/E port, such as the I/E port 112. For example, the queue 515 is configured to buffer data generated by the node 500 (e.g., injected via inject path 561) and destined for a node, such as a node 410 in the network 400.

The Xbar switches 530 are devices configured to connect multiple inputs to multiple outputs. For example, the Xbar switches 530 comprise cross-point matrices that provide a connection point between any input and output pair. The control unit 520 comprises control logic configured to perform routing control, flow control, and/or other control functions to facilitate data transfer in and out of the node 500. A first of the Xbar switches 530 is coupled to the queues 511-512 and 515 and the control unit 520 for switching counter clockwise data. A second of the Xbar switches 530 is coupled to the queues 513-514 and 515 and the control unit 520 for switching clockwise data. The control unit 520 performs routing to determine a forwarding path for the data buffered in the queues 511-515 and configures the XBar switches 530 to route the data to a port corresponding to the forwarding path. For example, the data buffered in the queues 511-514 may be sent to a shortcut ring or a base ring or ejected from the network (e.g., via eject paths 562) when the node 500 is the destination. As shown in FIG. 5A, incoming data traveling in a counter clockwise direction is routed to an output path 551 towards a shortcut ring or an output path 552 towards the base ring in the counter direction. Incoming data traveling in a clockwise direction is routed to an output path 553 towards a shortcut ring or an output path 554 towards the base ring in the clockwise direction. Data initiated by the node 500 may be routed to any one of the output paths 551-554 according to the forwarding path selected by the control unit 520.

Figure 5B:
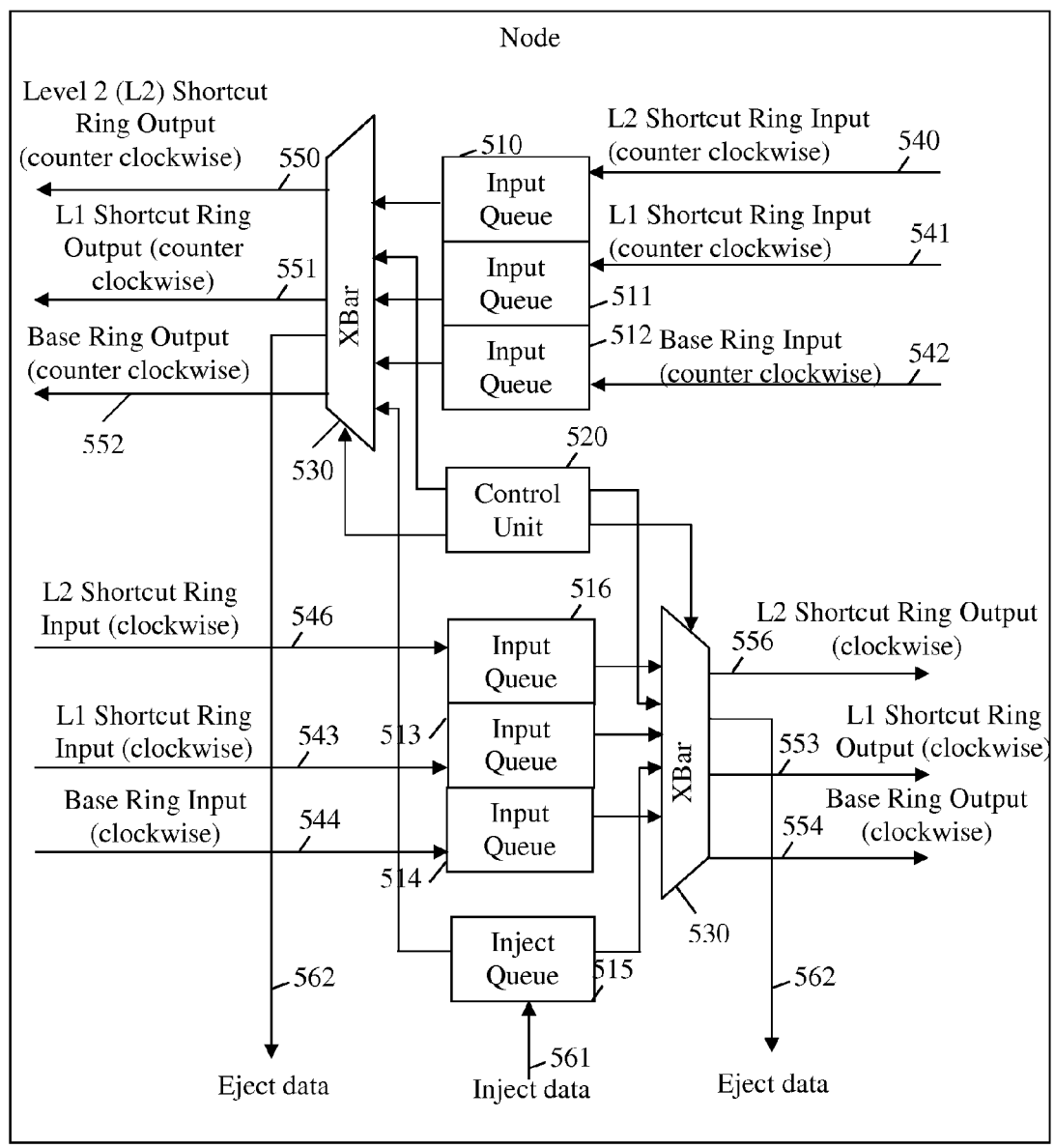
FIG. 5B is a schematic diagram of an embodiment of a logical structural view of a node that is used on level 1-2 rings of a ring network.

FIG. 5B is a schematic diagram of an embodiment of a logical structural view of a node 570 that is used on level 1-2 rings of a ring topology network. Although the node 570 may not represent any nodes in the network 400 as shown in FIG. 4 because the nodes labeled 0, 4, 8, and 12 are used for levels 1-3 rings, the node 570 may represent nodes 4 and 12 if their level 3 ring is removed. Additionally, the node 570 may be in a network where level 4 or higher ring is available. One of ordinary skill in the art would recognize that most aspects of the node 570 is the same as or similar to the node 500 in FIG. 5A, except that there is one more level 2 shortcut ring input/output queue in both the clockwise and counter clockwise directions. The queues 510 and 516 for the level 2 ring are configured to interface with interconnect I/O ports, such as the interconnect ports 111. For example, the queue 510 is configured to buffer data received from a counter clockwise level 2 shortcut ring input path 540, where the data is travelling in a counter clockwise in the level 2 shortcut ring. The queue 516 is configured to buffer data received from a clockwise level 2 shortcut ring input path 546.

The control unit 520 performs routing to determine a forwarding path for the data buffered in the queues 510 and 516 and configures the XBar switches 530 to route the data to a port corresponding to the forwarding path. For example, the data buffered in the queues 510 and 516 may be sent to a shortcut ring or a base ring or ejected from the network (e.g., via eject paths 562) when the node 500 is the destination. As shown in FIG. 5B, incoming data from the queue 510 traveling in a counter clockwise direction is routed to an output path 550 towards a level 2 shortcut ring, the output path 551 towards a level 1 shortcut ring, or the output path 552 towards the base ring in the counter clockwise direction. Incoming data traveling from the queue 516 in a clockwise direction is routed to an output path 556 towards a level 2 shortcut ring, the output path 553 towards a level 1 shortcut ring, or the output path 554 towards the base ring in the clockwise direction. Data initiated by the node 500 may be routed to any one of the output paths 550-554 and 556 according to the forwarding path selected by the control unit 520.

Figure 5C:
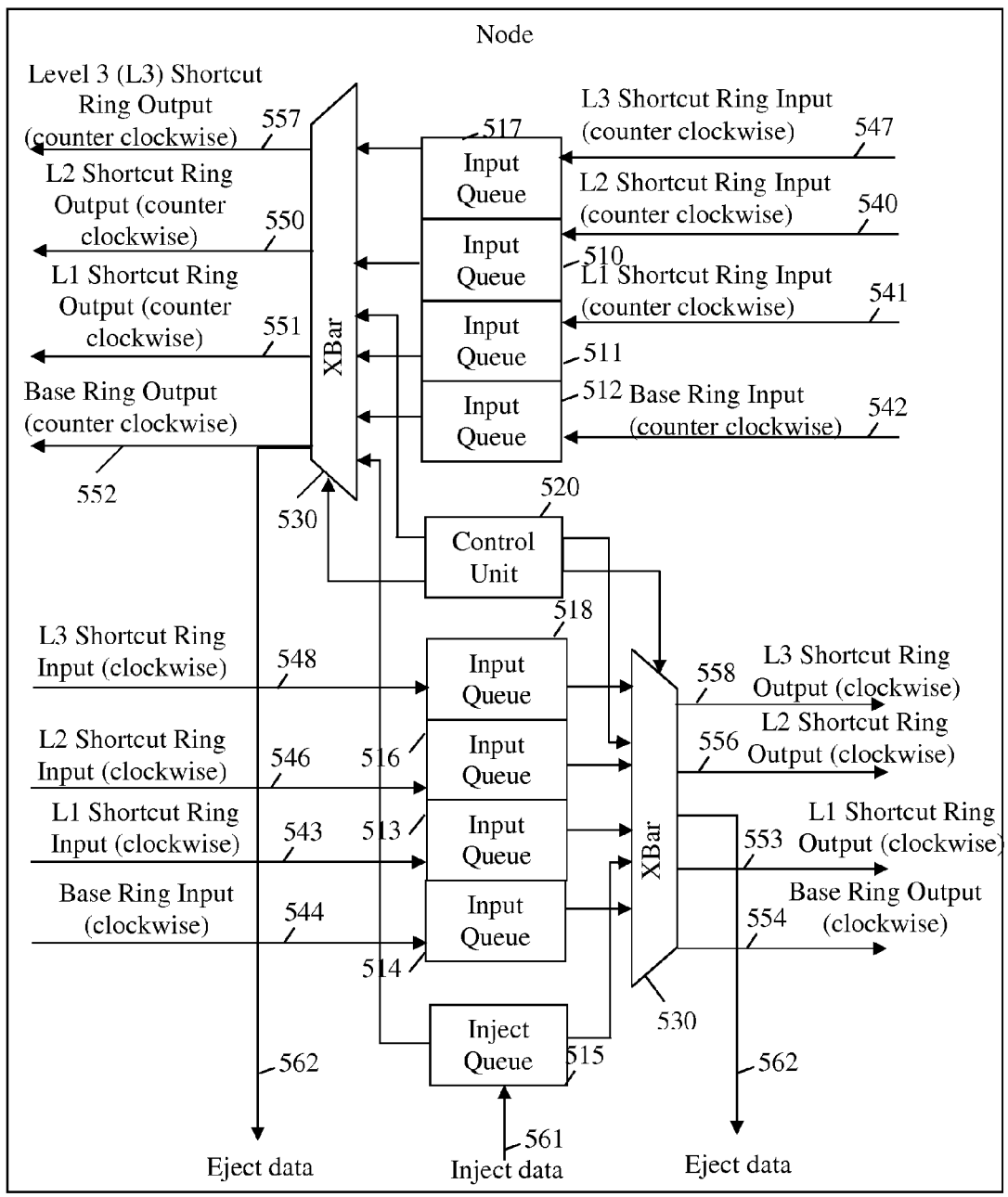
FIG. 5C is a schematic diagram of an embodiment of a logical structural view of a node that is used on level 1-3 rings of a ring network.

FIG. 5C is a schematic diagram of an embodiment of a logical structural view of a node 590 that is used on level 1-3 rings of a ring topology network. The node 500 may represent any of nodes labeled 0, 4, 8, and 12 in the network 400. One of ordinary skill in the art would recognize that most aspects of the node 590 is the same as or similar to the node 500 in FIG. 5A and the node 570 in FIG. 5B, except that there is one more level 3 shortcut ring input/output queue in both the clockwise and counter clockwise directions. The queues 517 and 518 for the level 3 ring are configured to interface with interconnect I/O ports, such as the interconnect ports 111. For example, the queue 517 is configured to buffer data received from a counter clockwise level 3 shortcut ring input path 547, where the data is travelling in a counter clockwise in the level 3 shortcut ring. The queue 518 is configured to buffer data received from a clockwise level 3 shortcut ring input path 548.

The control unit 520 performs routing to determine a forwarding path for the data buffered in the queues 517 and 518 and configures the XBar switches 530 to route the data to a port corresponding to the forwarding path. For example, the data buffered in the queues 517 and 518 may be sent to a shortcut ring or a base ring or ejected from the network (e.g., via eject paths 562) when the node 500 is the destination. As shown in FIG. 5C, incoming data from the queue 517 traveling in a counter clockwise direction is routed to an output path 557 towards a level 3 shortcut ring, the output path 550 towards a level 2 shortcut ring, the output path 551 towards a level 1 shortcut ring, or the output path 552 towards the base ring in the counter clockwise direction. Incoming data traveling from the queue 518 in a clockwise direction is routed to an output path 558 towards a level 3 shortcut ring, the output path 556 towards a level 2 shortcut ring, the output path 553 towards a level 1 shortcut ring, or the output path 554 towards the base ring in the clockwise direction. Data initiated by the node 500 may be routed to any one of the output paths 550-554 and 556-558 according to the forwarding path selected by the control unit 520. As such, nodes 500, 570, and/or 590 may be employed to implement methods 700, 800, 900, 1000, and/or any other method disclosed herein.

Figure 6:
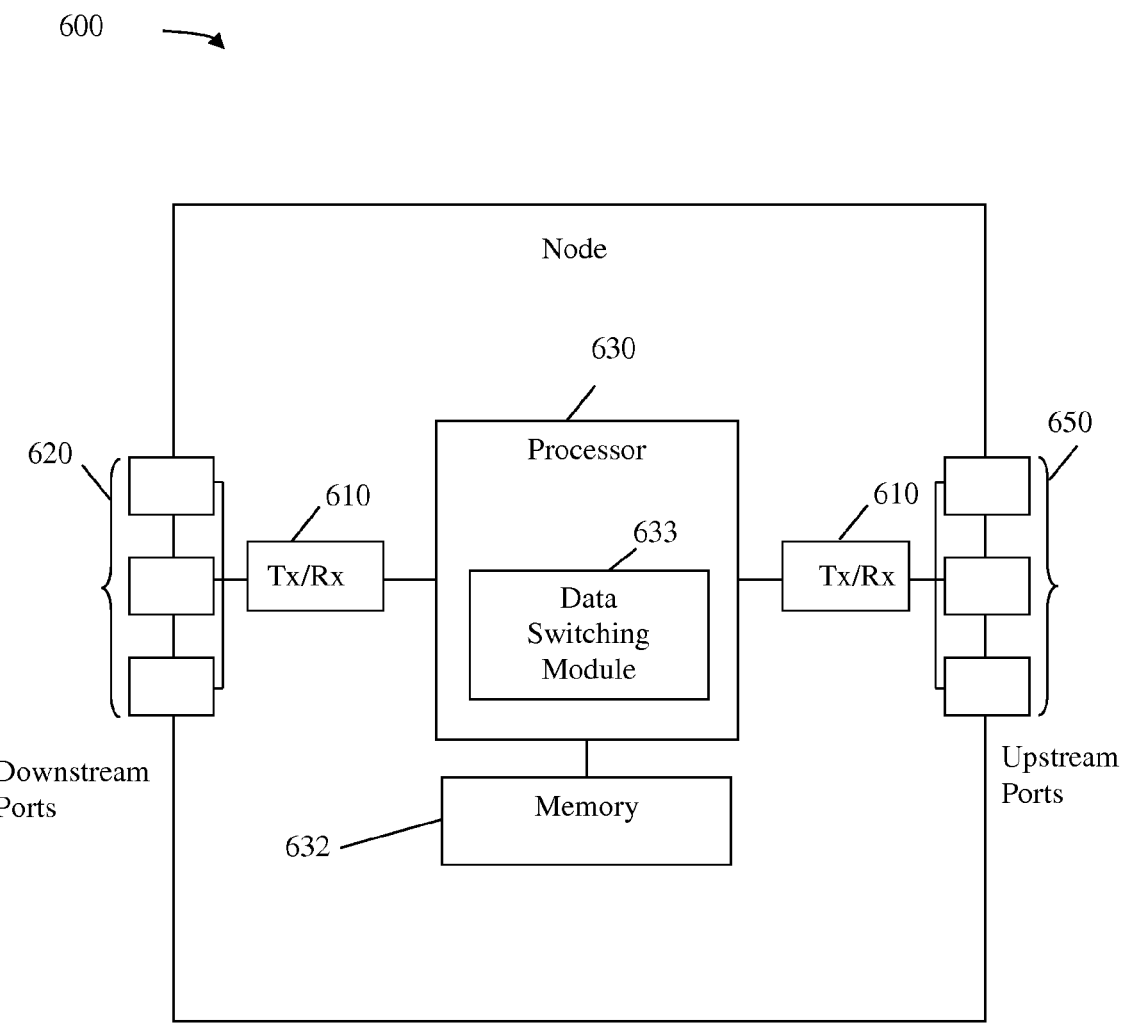
FIG. 6 is a schematic diagram of another example embodiment of a node.

FIG. 6 is a schematic diagram of another example embodiment of a node 600, which may act as a node in a hierarchical network, such as the network 400. For instance, the node 600 may be a router, switch, and/or bridge when the network is a communication network. In an SoC and/or NoC, the node 600 may be a processing core, memory block, timing source, and/or a peripheral. In a data center, the node 600 may be network equipment, such as a server. The node 600 may be configured to implement and/or support the routing mechanisms described herein. Node 600 may be implemented in a single node or the functionality of node 600 may be implemented in a plurality of nodes. One skilled in the art will recognize that the term node encompasses a broad range of devices of which node 600 is merely an example. Node 600 is included for purposes of clarity of discussion, but is in no way meant to limit the application of the present disclosure to a particular node embodiment or class of node embodiments. At least some of the features and/or methods described in the disclosure may be implemented in a network apparatus or module such as a node 600. For instance, the features and/or methods in the disclosure may be implemented using hardware, firmware, and/or software installed to run on hardware. As shown in FIG. 6, the node 600 may comprise transceivers (Tx/Rx) 610, which may be transmitters, receivers, or combinations thereof. A Tx/Rx 610 may be coupled to plurality of downstream ports 620 for transmitting and/or receiving frames from other nodes and a Tx/Rx 610 may be coupled to plurality of upstream ports 650 for transmitting and/or receiving frames from other nodes, respectively. A processor 630 may be coupled to the Tx/Rx 610 to process the frames and/or determine which nodes to send the frames to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). Processor 630 may comprise a data switching module 633, which may perform data switching and/or flow control functions of a node 410 and implement methods 700, 800, 900 and 1000, as discussed more fully below, and/or any other method discussed herein. In an alternative embodiment, the data switching module 633 may be implemented as instructions stored in the memory devices 632, which may be executed by the processor 630 to implement methods 700, 800, 900 and 1000. The memory device 632 may comprise a cache for temporarily storing content, e.g., a RAM. Additionally, the memory device 632 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the node 600, at least one of the processor 630 and/or memory device 632 are changed, transforming the node 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The disclosed hierarchical networks, such as the network 400, may employ various routing rules and mechanisms to route data in the network. To identify a forwarding path from a source node to a destination node, which may be any nodes in the network, a shortest path is selected from either a clockwise transfer direction or a counter clockwise transfer direction such that data is transferred in a single direction from the source to the destination. The shortest path refers to the path with the minimum number of hops. The shortest path may include base links, such as the base links 412, and/or shortcuts, such as the shortcuts 420, 430, and/or 441-444. After identifying the shortest path, the node in a next hop and the transfer direction may be stored in a routing table. During real-time network operations, when the node receives a data from the network, the node determines a next hop for forwarding the data based on the destination of the data. If the destination is not the node itself, the node looks up the next hop in the routing table and forwards the data to the next hop, which may be reached via a base link or a shortcut link. If the destination is the node itself, the data terminates at the node. Thus, the real-time routing is relatively simple. It should be noted that the routing table does not comprise history of the forwarding path, thus the routing table is stateless.

As a routing rule, a routing path from a node I to a node J, where I and J are node labels, should be either all clockwise or all counter clockwise. Under this rule, directional switching is not allowed. For instance, when routing from node 1 to node 9 in the network 400, path 1→0→8→9 (3 hops) is the shortest, but there is a directional switch because 1→0 is counter clockwise and 8→9 is clockwise. Consequently, such path is not taken. Instead, an all-clockwise path 1→2→4→8→9 (4 hops), or an all-counter clockwise path 1→0→12→10→9 (4 hops), should be selected. In an embodiment, there are two layers of routing rules, the first of which is the single direction rule, and the second of which is the all possible routes rule. For example, in the example above, if directional switching gives the shortest routing path after comparison of multiple paths, the rule is adjusted to allow directional switching.

Since the shortest path from node A to B may not be unique (e.g., path 1→2→4→8→9 (4 hops) and path 1→0→12→10→9 both have four hops), there may be a decision algorithm to determine the optimal route. For instance, one direction (e.g., clockwise) can be set as the default direction to break hop count ties. Due to the complexity of the algorithm, in some embodiments the routing solutions are calculated off line, e.g., by exploring all the possible paths from I to J then picking the shortest one, and stored in a routing table. The result is reflected in a shortest path table for any node I to J. The table would have N×(N−1) entries, where N represents number of nodes in the ring network. Each entry contains the full hop list along the path. The routing table should have N−1 entries and K bits if the node connects to K levels of binary code and gray code rings. For example, if the shortest path from node 1 to node 13 is 1→0→15→14→13. The routing table at node 1 for destination node 13, would be the base ring path in the counter clockwise direction.

If the binary code shortcuts follow some regularity, then it may be more convenient to build the logic according to a regular equation. For example, assume there are $N=2^K$ nodes in a ring topology, with nodes labeled clockwise between 0 to N−1 (e.g., FIG. 4 shows N=16 and k=4 case), and that a message is going from node I to node J, where I and J are node labels. In an embodiment, the routing of the message takes the clockwise path if $|J-I|<=N/2$. Otherwise if $|J-I|>N/2$, the routing takes the counter clockwise path. En route to the destination J, at an intermediate node X, the message takes the path with the largest step size towards the final destination.

The disclosed hierarchical networks may additionally employ VCs to avoid deadlocks. In a hierarchical network (e.g., the network 400), each node may transfer data in a base ring or a shortcut ring in a clockwise direction or in a counter clockwise direction. A node may support such a data transfer scheme by employing a number of physical channels. For example, for a node participating in a level 1 shortcut ring, a first physical channel may be employed for transferring data in a clockwise direction in the shortcut ring. A second physical channel may be employed for transferring data in a counter clockwise direction in the shortcut ring. A third physical channel may be employed for transferring data in a clockwise direction in the base ring. A fourth physical channel may be employed for transferring data in a counter clockwise direction in the base ring. A deadlock may occur when an incoming data arrives at a physical channel while the physical channel is busy operating on a previously received data. To avoid such a deadlock, the node may employ two VCs for each physical channel. For example, an incoming data may arrive at a physical channel while one VC is busy operating on a previously received data, but the other VC may accept the incoming data. To implement the VC scheme, each node may employ separate buffers for each VC. For example, to support two VCs, the node 500 may partition each queue 511-514 into two separate portions, each mapped to a VC and each configured to operate independently.

Data transfer may usually be limited to a single transfer direction in a clockwise direction or a counter clockwise direction in the network. The limitation on the single transfer direction is based on the employment of physical channels. By limiting the data transfer to a single transfer direction, the probabilities of contentions and/or deadlocks may be reduced in the network. However, when VCs are employed, the transfer direction may be changed between a source-destination pair. For example, when two VCs are employed, the transfer direction may be changed once in a forwarding path between a source-destination pair.

To incorporate the VC scheme with two VCs, VC0 and VC1, into the routing algorithm, a shortest path is selected for a source-destination pair, where the shortest path may comprise at most one transfer direction switch. For example, the first hop beginning at a source is assigned to VC0, subsequent hops in the same transfer direction as the first hop are also assigned to VC0, and a hop that switches the transfer direction is assigned to VC1. The routing algorithm allows a switch in transfer direction to occur under two conditions. The first condition occurs when a second hop traverses through a link between a node with address 0 and a node with address N−1 (e.g., from node 0 to node N−1 or from node N−1 to node 0), where N is the total number of nodes in the network. The second condition occurs when a hop subsequent to the second hop switches the transfer direction. It should be noted that although the VC scheme is described with the employment of two VCs, the VC scheme may be applied to multiple VCs. In general, the maximum number of transfer direction switches may be configured to be about one less than the total number of VCs.

Figure 7:
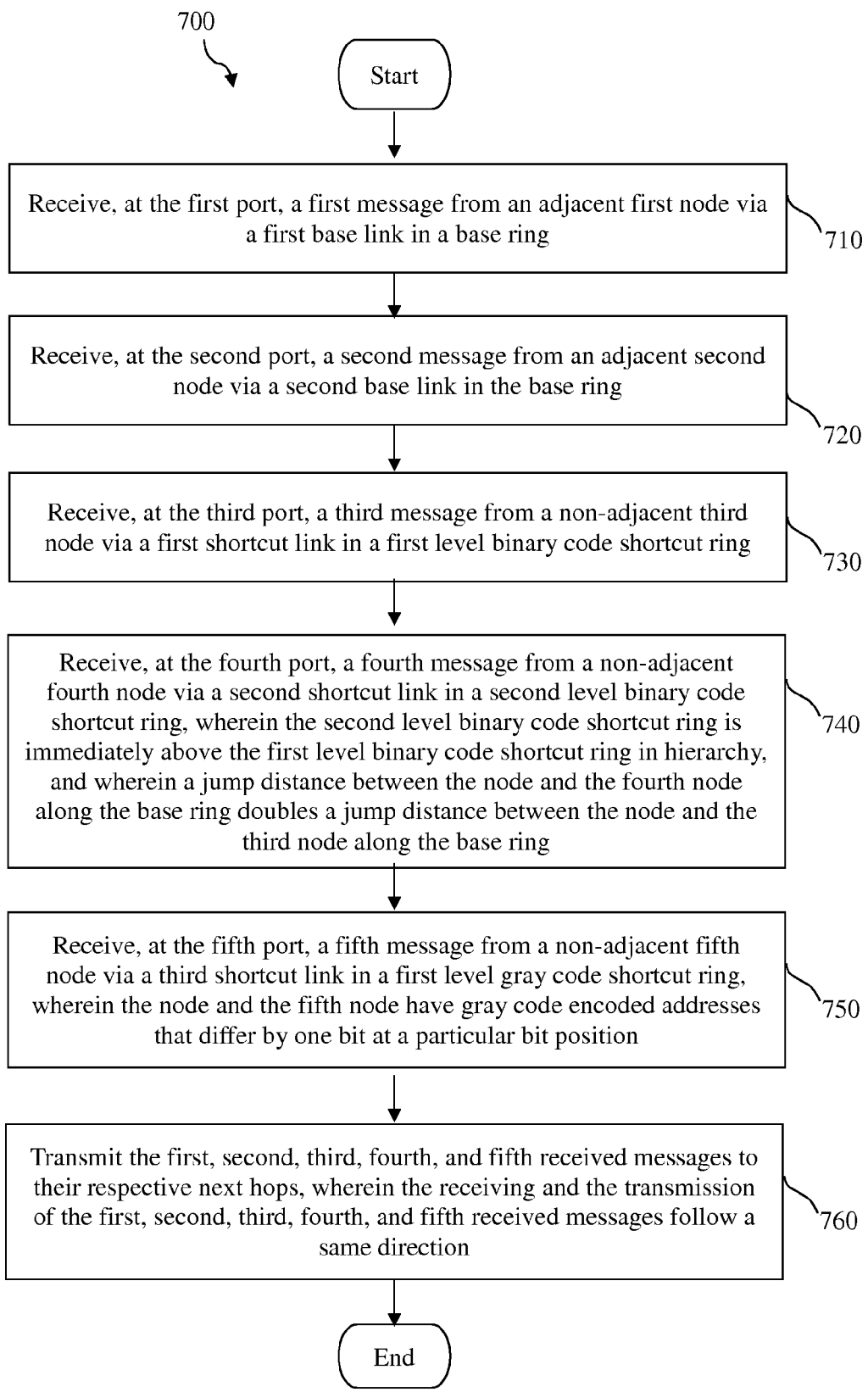
FIG. 7 is a flowchart of an embodiment of a method for routing messages in an interconnect network with a ring topology.

FIG. 7 is a flowchart of an embodiment of a method 700 for routing messages in an interconnect network with a ring topology (e.g., the network 400). The method 700 may be implemented by a node (e.g., node 0, 4, 8, or 12 in FIG. 4) that comprises at least first, second, third, fourth, and fifth ports. The method 700 may be implemented when the node is active and prepared to route messages and/or packets. In step 710, the node receives, at the first port, a first message from an adjacent first node via a first base link in a base ring. In step 720, the node receives, at the second port, a second message from an adjacent second node via a second base link in the base ring. In step 730, the node receives, at the third port, a third message from a non-adjacent third node via a first shortcut link in a first level binary code shortcut ring. In step 740, the node receives, at the fourth port, a fourth message from a non-adjacent fourth node via a second shortcut link in a second level binary code shortcut ring. In an embodiment, the second level binary code shortcut ring is immediately above the first level binary code shortcut ring in hierarchy. Therefore, a jump distance between the node and the fourth node along the base ring doubles a jump distance between the node and the third node along the base ring.

In step 750, the node receives, at the fifth port, a fifth message from a non-adjacent fifth node via a third shortcut link in a first level gray code shortcut ring. In an embodiment, the node and the fifth node have gray code encoded addresses that differ by one bit at a particular bit position. In step 760, the node determines respective next hops for the first, second, third, fourth, and fifth received messages based at least in part on a shortest path routing table stored in the node. In step 770, the node transmits the first, second, third, fourth, and fifth received messages to their respective next hops. In an embodiment, the receiving and the transmission of the first, second, third, fourth, and fifth received messages follow a same direction, either clockwise or counter clockwise.

Figure 8:
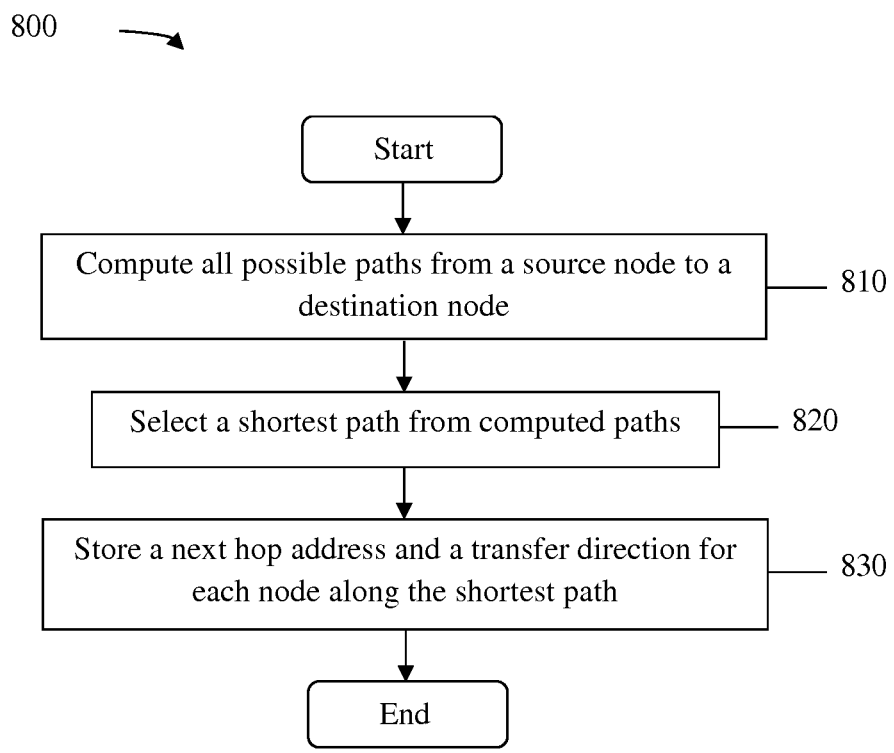
FIG. 8 is a flowchart of an embodiment of a method for generating a routing table.

FIG. 8 is a flowchart of an embodiment of a method 800 for generating a routing table. The method 800 may be implemented offline, for example, on a computer or a workstation during a configuration phase of a network prior to routing packets. The routing table may be pre-configured and stored in a node, such as the node 410 and/or 510, in a hierarchical ring network, such as the network 400 and/or 500, for use in static routing after a configuration phase. At step 810, all possible data forwarding paths are computed from a source node to a destination node in the network. For example, each path traverses the nodes along the path in a single transfer direction, which may be clockwise or counter clockwise. At step 820, a shortest path is selected from the computed data forwarding paths, where the shortest path is the path that comprises a least number of intermediary nodes. At step 830, a next hop address and a transfer direction for each node along the shortest path is stored in a shortest path routing table entry. The method 800 is repeated for each node in the network. For example, N−1 entries are generated for each node in a network that comprises N nodes, where N is a positive integer.

Figure 9:
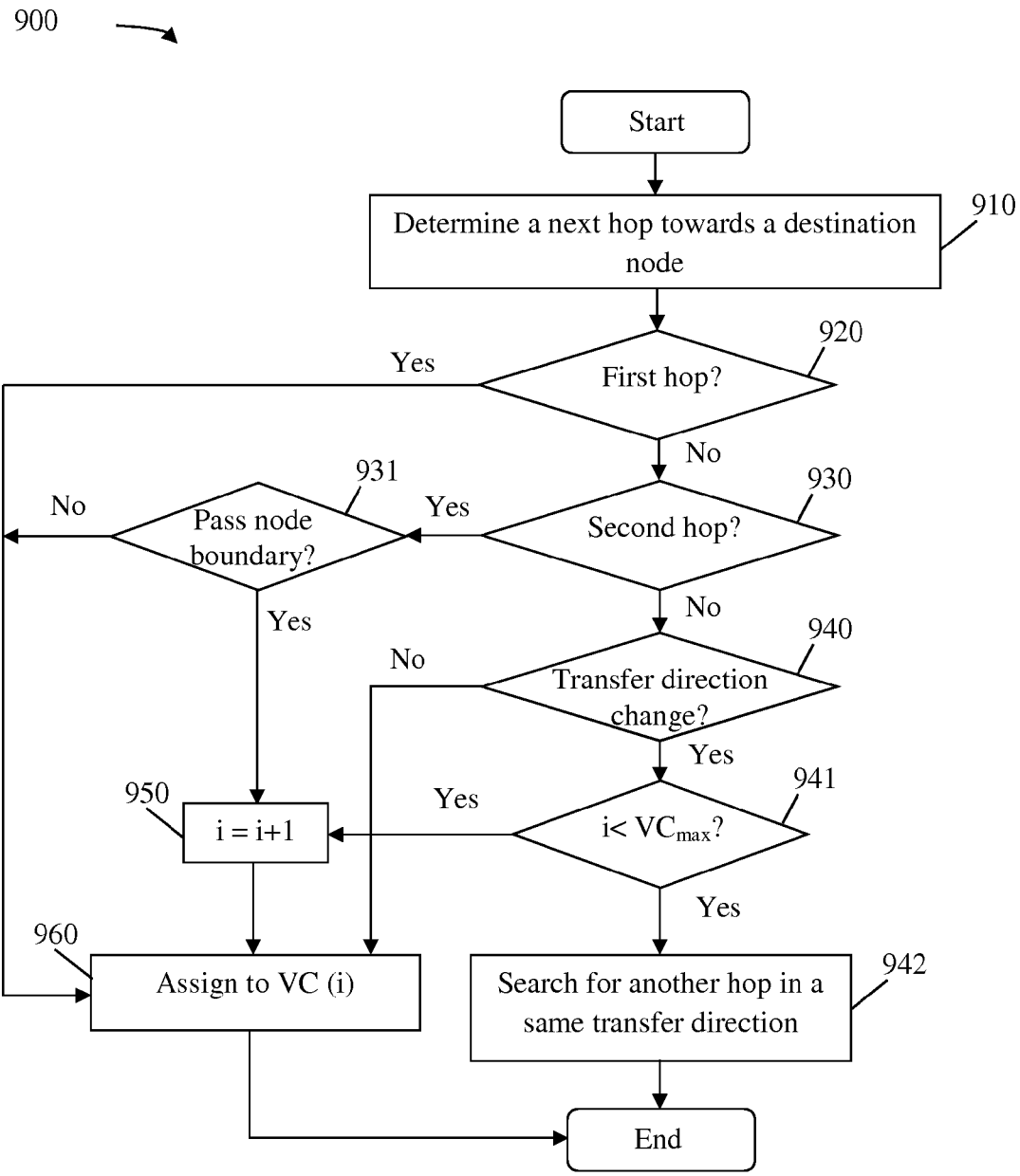
FIG. 9 is a flowchart of an embodiment of a method for assigning virtual channels (VCs).

FIG. 9 is a flowchart of an embodiment of a method 900 for assigning VCs. The method 900 may be implemented offline for example, on a computer or a workstation during a configuration phase of a network prior to routing packets. The method 900 may be employed in conjunction with the method 800 to generate a routing table that allows a data forwarding path to change the transfer direction. Similarly, the routing table is employed by a node, such as the node 410, in a hierarchical ring network, such as the network 400, for static routing after a configuration phase. The method 900 is applied when determining a next hop between a source node and a destination node, for example, during step 810 in the method 800. At step 910, a next hop towards the destination node is determined. At step 920, a determination is made whether the next hop is a first hop from the source node. If the next hop is a first hop from the source node, next at step 960, a VC number i, denoted as VC(i), is assigned to the first hop. For example, i may be initialized to a value of 0. If the next hop is not a first hop from the source node, next at step 930, a determination is made whether the next hop is a second hop from the source node.

If the next hop is a second hop, next at step 931, a determination is made whether the second hop passes a node boundary. For example, when the network comprises N nodes, the node boundary may be selected to be between node 0 and node N−1. A hop is considered to pass the node boundary when the hop crosses over the boundary in a clockwise direction (e.g., from node m to node n, where m>n) or in a counter clockwise direction (e.g., from node m to node n, where m<n). If the second hop passes the node boundary, next at 950, the VC channel number, i, is incremented by one, and at step 960, VC(i) is assigned to the second hop. Otherwise, next at step 960, VC(i) is assigned to the second hop.

If the next hop is not a second hop, next at step 940, a determination is made whether the next hop changes the transfer direction when compared to a previous hop, for example, from a clockwise direction to a counter clockwise direction or from a counter clockwise direction to a clockwise direction. If the transfer direction is not changed, next at step 960, VC(i) is assigned to the next hop. If the transfer direction is changed, next at step 941, a determination is made whether the VC number has reached a maximum number of VCs, denoted at $VC_{max}$. If the VC number is less than $VC_{max}$, next at step 950, the VC channel number, i, is incremented by one, and at step 960, VC(i) is assigned to the next hop. If the VC number has reached $VC_{max}$, next at step 942, a search is made to determine another hop in the same transfer direction.

Figure 10:
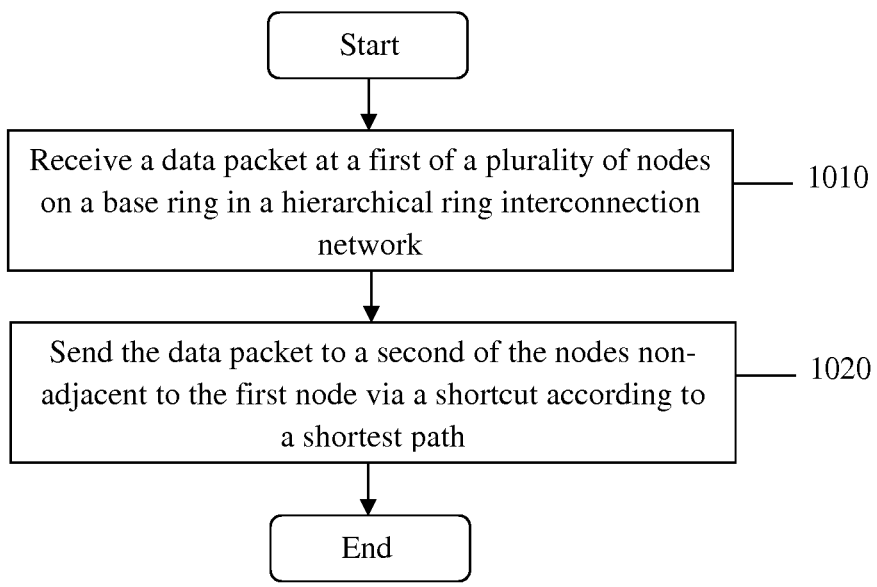
FIG. 10 is a flowchart of an embodiment of a method for transferring data in a hierarchical ring interconnect network.

FIG. 10 is a flowchart of an embodiment of a method 1000 for transferring data in a hierarchical ring interconnect network, such as the network 400. Method 1000 may be implemented by a node, such as a node 410. The method 1000 may be implemented when the node is active and prepared to route messages and/or packets. At step 1010, a data packet is received at a first of a plurality of nodes on a base ring in the network. For example, the network comprises a plurality of nodes, such as the nodes 410, arranged in a ring topology and interconnected by a plurality of base links, such as the base links 412, to form the base ring. At step 1020, the data packet is sent to a second of the nodes that is non-adjacent to the first node via a shortcut, such as the shortcuts 420, 430, 441-444, 450, and 460. The shortcut is a physical connection that directly connects the first node to the second node and the placement of the shortcut may be determined by employing substantially similar mechanisms as described above in the network 400. The shortcut connection provides a shortest path in the network for the data packet to a destination node of the data packet. For example, the shortest path may be determined offline by employing similar mechanisms as described in the methods 700 and/or 800 and the shortcut that leads to the second node may be stored in a routing table.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A hierarchical ring network comprising:
a plurality of nodes coupled together in a base ring configuration such that each node is coupled to two adjacent nodes via base links,
wherein at least some of the nodes are further coupled together via a first level binary shortcut ring such that alternating nodes along the base ring act as first level binary nodes, and
wherein the first level binary nodes are selected based on a binary address of each of the plurality of nodes.

2. The hierarchical ring network of claim 1, wherein the nodes are further coupled together via a second level binary shortcut ring such that alternating nodes along the first level binary shortcut ring also act as second level binary nodes, and wherein the second level binary node are selected base on the binary address of each of the plurality of nodes.

3. The hierarchical ring network of claim 1, wherein N is a positive integer representing a total number of the plurality of nodes, wherein the nodes are further coupled together via a level k1 binary shortcut ring, wherein k1 is an integer between 2 and $(Log_2(N)-1)$, and wherein a jump distance between two nearest adjacent nodes along the level k1 binary shortcut ring equals $2^{k1}$.

4. The hierarchical ring network of claim 3, wherein the nodes are arranged such that the nodes are represented using consecutive integer addresses ranging from 0 to N−1 in a single direction on the base ring, wherein binary shortcut links are configured such that each node address X is connected on the level k1 binary shortcut ring, and wherein X is an integer between 0 and N−2 that satisfies modular operation: $X \bmod (2^{k1})=0$.

5. The hierarchical ring network of claim 1, wherein the nodes are further coupled together via a plurality of rings including the first binary shortcut ring and the base ring arranged in a hierarchy, wherein each of the rings couples half of the nodes coupled by a next lower level ring in the hierarchy.

6. The hierarchical ring network of claim 1, wherein some of the plurality of nodes are further coupled together via at least one gray code shortcut rings arranged in a hierarchy base on the gray code encoded address of each of the plurality of the node, wherein the at least one gray code shortcut ring couples the some of the plurality of nodes that are differed by 1-bit at a particular bit position.

7. The hierarchical ring network of claim 6, wherein N is a positive integer representing a total number of the nodes, wherein a first level of the gray code shortcut rings is a level k2 gray code shortcut ring, wherein k2 is an integer between 1 and $(Log_2(N)-1)$, and wherein a jump distance between the nodes coupled together via the first gray code shortcut ring equals $2^{k2}$.

8. The hierarchical ring network of claim 7, wherein a particular bit position corresponds to a $k2^{th}$ least significant bit (LSB) of the addresses when $1 \leq k2 \leq (Log_2(N)-2)$.

9. The hierarchical ring network of claim 7, wherein the nodes are arranged such that the nodes are represented using consecutive gray code encoded addresses ranging from 0 to N−1 in a single direction on the base ring, wherein gray code shortcut links are configured such that each node address X is connected on the level k2 gray code shortcut ring, and wherein X is an integer between 0 and N−2 that satisfies modular operations $X \bmod (2^{k2-1})=0$ and $X \bmod (2^{k1}) \ne 0$.

10. The hierarchical ring network of claim 1, wherein data packets are routed through the network by employing a plurality of virtual channels, wherein each data packet is routed through the network in a consistent direction, and wherein each data packet is allowed to change direction only when changing virtual channels.

11. A method of routing messages in a hierarchical ring network topology at a node that comprises first, second, third, fourth, and fifth ports, the method comprising:
receiving, at the first port, a first message from an adjacent first node via a first base link in a base ring;
receiving, at the second port, a second message from an adjacent second node via a second base link in the base ring;
receiving, at the third port, a third message from a non-adjacent third node via a first shortcut link in a first level binary code shortcut ring;
receiving, at the fourth port, a fourth message from a non-adjacent fourth node via a second shortcut link in a second level binary code shortcut ring, wherein a jump distance between the node and the fourth node along the base ring doubles a jump distance between the node and the third node along the base ring;
receiving, at the fifth port, a fifth message from a non-adjacent fifth node via a third shortcut link in a first level gray code shortcut ring, wherein the node and the fifth node have gray code encoded addresses that differ by one bit at a particular bit position; and
determining respective next hops for the first, second, third, fourth, and fifth received messages based at least in part on a shortest path routing table stored in the node.

12. The method of claim 11, wherein the second level binary code shortcut ring is immediately above the first level binary code shortcut ring in hierarchy, wherein the second level binary code shortcut ring connects half as many nodes as the first level binary code shortcut ring, and wherein the particular bit position is determined by the first level gray code shortcut ring.

13. The method of claim 11, wherein N is a positive integer representing a total number of the plurality of nodes, wherein the second level binary code shortcut ring is a level k1 binary code shortcut ring, wherein k1 is an integer between 2 and $(Log_2(N)-1)$, and wherein the jump distance between the node and the fourth node equals $2^{k1}$.

14. The method of claim 13, wherein the plurality of nodes are arranged such that the nodes are represented using consecutive integer addresses ranging from 0 to N−1 in a single direction on the ring network, wherein binary code shortcut links are configured such that each node address X is connected on the level k1 binary code shortcut ring, and wherein X is an integer between 0 and N−2 that satisfies modular operation: $X \bmod (2^{k1})=0$.

15. The method of claim 11, wherein N is a positive integer representing a total number of the plurality of nodes, wherein the first level gray code shortcut ring is a level k2 gray code shortcut ring, wherein k2 is an integer between 1 and $(Log_2(N)-1)$, and wherein a jump distance between the node and the fifth node equals $2^{k2}$, and wherein the particular bit position corresponds to a $k2^{th}$ least significant bit (LSB) of the gray code encoded addresses when $1 \leq k2 \leq (Log_2(N)-2)$.

16. The method of claim 15, wherein the plurality of nodes are arranged such that the nodes are represented using consecutive integer addresses ranging from 0 to N−1 in a single direction on the ring network, wherein gray code shortcut links are configured such that each node address X is connected on the level k2 gray code shortcut ring, and wherein X is an integer between 0 and N−2 that satisfies modular operations X mod $(2^{k2-1})$=0 and X mod $(2^{k2})$!=0.

17. The method of claim 11, further comprising transmitting the first, second, third, fourth, and fifth received messages to their respective next hops, wherein the receiving and the transmission of the first, second, third, fourth, and fifth received messages follow a common direction.

18. An interconnection system comprising:
a plurality of nodes, each comprising at least four ports; and
a plurality of links configured to interconnect the ports among the nodes to form a hierarchical ring topology, wherein the hierarchical ring topology comprises:
a base ring,
at least one binary shortcut ring connecting alternating nodes associated with a lower level ring, and
at least one gray code shortcut ring, wherein each pair of adjacent nodes on a gray code shortcut ring have gray code encoded addresses that differ by one bit at a particular bit position.

19. The interconnection system of claim 18, wherein N is a positive integer representing a total number of the plurality of nodes, wherein the plurality of nodes are arranged such that the nodes are represented using consecutive integer addresses ranging from 0 to N−1 in a single direction on the ring topology, wherein binary shortcut links are configured such that each node address X is connected on a level k1 binary code shortcut ring, wherein X is an integer between 0 and N−2 that satisfies modular operation: X mod $(2^{k1})$=0, wherein k1 is an integer between 1 and $(\log_2(N)-1)$.

20. The interconnection system of claim 18, wherein N is a positive integer representing a total number of the plurality of nodes, wherein the plurality of nodes are arranged such that the nodes are represented using consecutive gray code encoded addresses ranging from 0 to N−1 in a single direction on the ring network, wherein gray code shortcut links are configured such that each node address X is connected on a level k2 gray code shortcut ring, wherein X is an integer between 0 and N−1 that satisfies modular operations X mod $(2^{k2-1})$=0 and X mod $(2^{k2})$!=0, and wherein the particular bit position corresponds to a k2$^{th}$ least significant bit (LSB) of the gray code encoded addresses.

* * * * *